United States Patent [19]

Sekido et al.

[11] Patent Number: 5,583,770

[45] Date of Patent: Dec. 10, 1996

[54] ELECTRONIC CONTROL APPARATUS FOR FAILURE DIAGNOSIS

[75] Inventors: Tatsuya Sekido, Isehara; Toshio Iwasaki, Zama, both of Japan

[73] Assignee: Nissan Motor Co., Ltd., Kanagawa-ken, Japan

[21] Appl. No.: 220,336

[22] Filed: Mar. 30, 1994

[30] Foreign Application Priority Data

Apr. 2, 1993 [JP] Japan .................................. 5-077071

[51] Int. Cl.⁶ ............................ B60R 16/02; G05B 23/00; H02J 13/00
[52] U.S. Cl. ............................. 364/424.045; 364/424.04; 307/10.1; 340/438
[58] Field of Search ........................ 364/424.01, 424.03, 364/424.04, 424.05; 307/9.1, 10.1, 10.8; 340/904, 438, 458

[56] References Cited

U.S. PATENT DOCUMENTS

| | | | |
|---|---|---|---|
| 4,623,974 | 11/1986 | Denz et al. | 364/551.01 |
| 4,887,263 | 12/1989 | Steely | 370/85.1 |
| 4,924,391 | 5/1990 | Hirano et al. | 364/424.03 |
| 5,187,381 | 2/1993 | Iwasa et al. | 307/10.1 |
| 5,365,438 | 11/1994 | Mitchell et al. | 364/424.03 |
| 5,406,270 | 4/1995 | Van Lente | 340/825.34 |

*Primary Examiner*—Gary Chin
*Assistant Examiner*—Tan Q. Nguyen
*Attorney, Agent, or Firm*—Lowe, Price, LeBlanc & Becker

[57] ABSTRACT

An apparatus for driving an actuator loaded on an automotive vehicle in accordance with ON-OFF operation of an operation switch includes: an operation switch; an input circuit activated by operation of the operation switch for driving the actuator; an input detecting section for detecting whether the input circuit is in an activated or deactivated status; a storing section for storing the detected status of the input circuit; a comparing section for comparing a present status of the input circuit newly detected by the input detecting section with a previous status of the input circuit stored in the storing section; an informing section for providing external information indicative of a mismatch between the present status and the previous status of the input circuit on the basis of comparison results of the comparing section; and a stored status updating section for updating the previous status stored in the storing section on the basis of the newly detected present status after the present status and the previous status have been compared with each other. When the operation switch is operated to the ON-state, if the informing section does not provide external mismatch information the apparatus thus indicates that at least one of the operation switch and the input circuit is operating abnormally, while if the informing section does provide the external mismatch information, the apparatus is indicating that both the operation switch and the input circuit are operating normally.

3 Claims, 9 Drawing Sheets

ELECTRONIC CONTROL APPARATUS FOR FAILURE DIAGNOSIS

BACKGROUND OF THE INVENTION

1. Field of the Invention

The present invention relates to an electronic control apparatus for an automotive vehicle, which is provided with an failure diagnosis function.

2. Description of the Related Art

In general, an automotive vehicle is usually provided with an electronic control apparatus for driving and controlling various actuators according to on-off operation of various operation switches. This electronic control apparatus includes an electronic control unit to which actuators and lamps are connected. In addition, a number of switches for actuating and deactuating the actuators and for turning on and off the lamps are also connected to the control unit. The control unit is composed of a microcomputer and peripheral parts so as to control the actuators and the lamps by executing control programs in accordance with the on-off operation of the switches.

In the conventional electronic control apparatus for an automotive vehicle, however, since another dedicated failure diagnosis apparatus must be connected to the electronic control unit in order to check whether the on-off operation of the operation switches is changed-over normally and further the switch information data are inputted to the electronic control unit normally, there exists a problem in that the manipulation of the failure diagnosis apparatus is rather complicated.

SUMMARY OF THE INVENTION

Accordingly, it is the object of the present invention to provide an electronic control apparatus for an automotive vehicle, which can diagnose failures of switch circuit without providing an additional diagnosis apparatus or an additional special apparatus.

To achieve the above-mentioned object, the present invention provides an electronic control apparatus for driving an actuator loaded on an automotive vehicle in accordance with ON-OFF operation of an operation switch, which comprises: an operation switch; an input circuit connected to the operation switch and the actuator, the input circuit being activated by the operation of the operation switch for driving the actuator; an input detecting section connected to the input circuit for detecting whether the input circuit is in an activated or deactivated status, repeatedly; a storing section connected to the input detecting section for storing the status of the input circuit detected by the input detecting section; a comparing section connected to the input detecting section and the storing section for comparing a present status of the input circuit newly detected by the input detecting section with a previous status of the input circuit stored in the storing section; an informing section connected to the comparing section for providing external information indicative of a mismatch between the present status of the input circuit and the previous status of the input circuit stored in the storing section on the basis of comparison results by the comparing section; and a stored status updating section connected to the comparing section and the storing section for updating the previous status stored in the storing section on the basis of the present status newly detected by the input detecting section after the present status and the previous status have been compared with each other. Accordingly, the apparatus of the invention provides an indication that at least one of the operation switch and the input circuit is operating abnormally when the informing section does not provide the external mismatch information when the operation switch is operated to the ON-state, and provides an indication that both the operation switch and the input circuit are operating normally when the informing section provides the external mismatch information and said operation switch is operated to the ON-state.

In the above-mentioned electronic control apparatus for an automotive vehicle, the input detecting section detects the status of the input circuit repeatedly, so that the status of the input circuit can be detected before and after the operation switch has been operated. Before the operation switch is not operated, since the status of the input circuit is not changed, the status detected by the input detecting section matches that stored in the memory section so that the informing section informs of nothing.

When the operation switch is operated, as far as there exists no failure in the operation switch and the input circuit, the status of the input circuit detected by the input detecting section must be changed from the status obtained before the operation switch is operated. Therefore, as the results of comparison by the comparing section, the status detected by the input detecting section does not match that stored in the storing section, so that the informing section informs of a mismatch. In other words, when the operation switch is operated, as far as the informing section informs of an information, it is possible to determine that the operation switch and the input circuit are operating normally.

On the other hand, in case there exists a failure in the operation switch and the input circuit, when the operation switch is operated, the status of the input circuit detected by the input detecting section is not changed from the status obtained before the operation switch is operated. Therefore, as the results of comparison by the comparing section, the status detected by the input detecting section matches that stored in the storing section, so that the informing section informs of nothing. In other words, in spite of the fact that the operation switch is operated, when the informing section informs of nothing, it is possible to determine that the operation switch or the input circuit is operating abnormally and thereby that there exists a failure in the operation switch or the input circuit.

Further, to achieve the above-mentioned object, the present invention provides an electronic control apparatus for driving an actuator which is loaded on an automotive vehicle in accordance with ON-OFF operation of an operation switch, the electronic control apparatus comprising: a master station; a slave station connected to the master station; a load connected to the slave station, the load having an operated status and an unoperated status; a communication device disposed in the master station, for transmitting and receiving signals to and from the slave station through a transmission line; and an output circuit disposed in the slave station, for applying signals transmitted by the master station through the transmission line to the load. The master station includes: a transmitting section for transmitting to the slave station a command signal for commanding the load to a predetermined status; a detecting section for receiving a status of the output circuit of the slave station; a comparing section for comparing the status received by the detecting section with the predetermined status transmitted by the transmitting section; and a room lamp turned from on to off and vice versa in response to a result of a comparison by the comparing section for informing of a mismatch between the status received by the detecting section and the predetermined status transmitted by the transmitting section.

In the above-mentioned electronic control apparatus, the detecting section of the master station detects the status of the output circuit of the slave station which changes according to the command signals. When the command signals are transmitted From the master station to the slave station, as far as there exists no failure in the transmission line and the output circuit of the slave station, the status of the output circuit detected by the detecting section changes according to the command signals. Therefore, as the results of comparison by the comparing section, since the status detected by the detecting section matches that transmitted by the transmitting section, the informing section informs of the comparison results indicative of an absence of failure.

On the other hand, in case there exists a failure in the communication line or the output circuit, when the command signals are outputted, the detected status of the output circuit does not change according to the command signals. Therefore, as the results of comparison by the comparing section, since the status detected by the detecting section does not match that transmitted by the transmitting section, the informing section informs of the obtained comparison results indicative of a presence of failure.

DETAILED DESCRIPTION OF THE PREFERRED EMBODIMENTS

Embodiments of the present invention will be described hereinbelow with reference to the attached drawings.

Figure 1A:
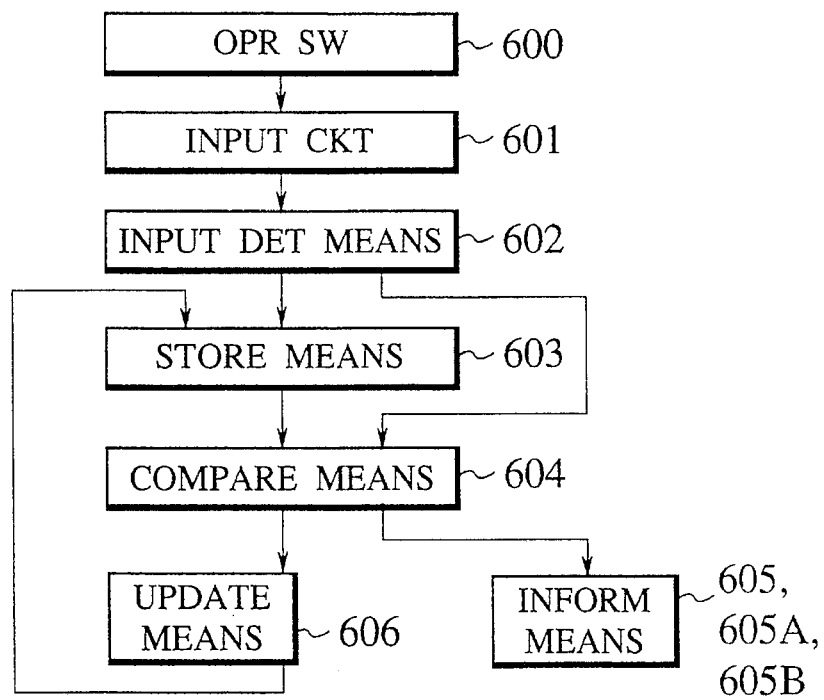
FIG. 1A is a conceptual block diagram showing a first embodiment of the electronic control apparatus for an automotive vehicle according to the present invention.

FIG. 1A is a conceptual block diagram showing a first embodiment of the electronic control apparatus according to the present invention. In the drawing, the electronic control apparatus for an automotive vehicle having an electronic control unit for driving and controlling various actuators operated by switches comprises: operation switches 600; input circuit 601 connected to the operation switches 600, respectively; input detecting means 602 for detecting statuses of the input circuit 601, repeatedly; storing means 603 for storing the input circuit statuses detected by the input detecting means 602; comparing means 604 for comparing input circuit status newly detected by the input detecting means 602 with those stored in the storing means 603; informing means 605 for informing of a mismatching between the input circuit statuses newly detected by the input detecting means 602 and those stored in the storing means 603 on the basis of comparison results by the comparing means 604; and stored status updating means 606 for updating the statuses stored in the storing means 603 on the basis of those newly detected by the input detecting means 602, after both the input circuit statuses have been compared with each other.

Figure 1B:
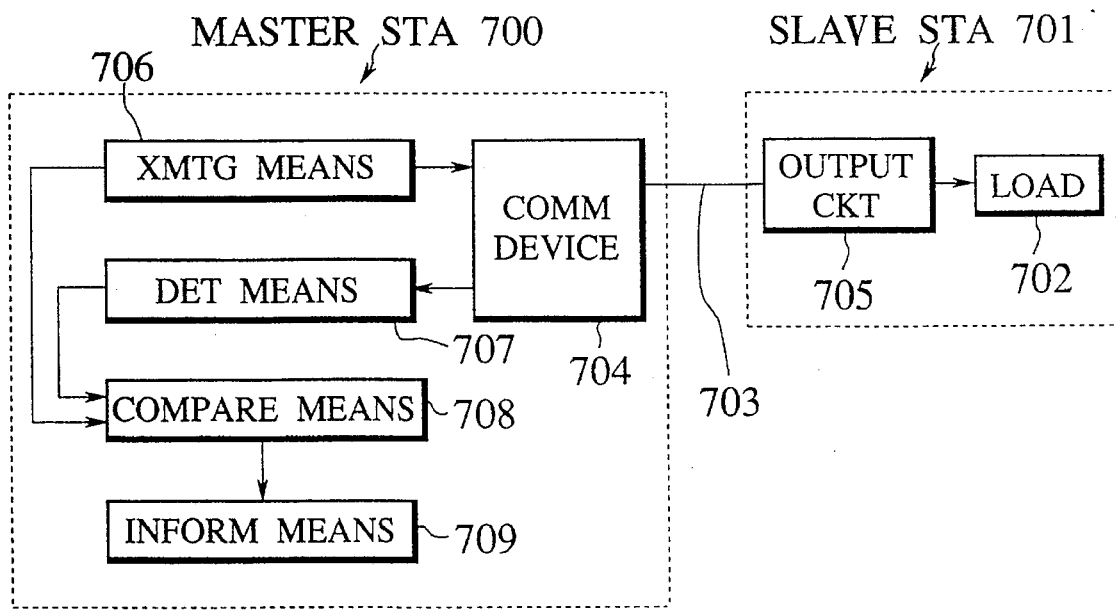
FIG. 1B is a conceptual block diagram showing a second embodiment of the electronic control apparatus for an automotive vehicle according to the present invention.

Further, FIG. 1B is a conceptual block diagram showing a second embodiment of the electronic control apparatus according to the present invention. In the drawing, an electronic control apparatus for an automotive vehicle having an electronic control unit for driving and controlling various actuators operated by switches includes: a master station 700; a plurality of slave stations 701; loads 702 connected to each of the slave stations 701; a communication device 704 disposed in the master station 700, for transmitting and receiving signals to and from each of the slave stations 701 through a transmission line 703; and output circuit 705 each disposed in each of the slave stations 701, for applying signals transmitted by the master station 700 to the loads 702 through the communication line 703, wherein the master station 700 comprises: transmitting means 706 for transmitting command signals for commanding the loads 705 to operate, to each of the slave stations 701; detecting means 707 for receiving statuses of the output circuit 705 of each of the slave stations 701 according to the command signals; comparing means 708 for comparing the statuses received by the detecting means 707 with those transmitted by the transmitting means 706; and informing means 709 for informing of a mismatching between the statuses detected by the detecting means 707 and those transmitted by the transmitting means 706 on the basis of comparison results by the comparing means 708.

The respective embodiments will be described in further detail hereinbelow.

First Embodiment

Figure 2:
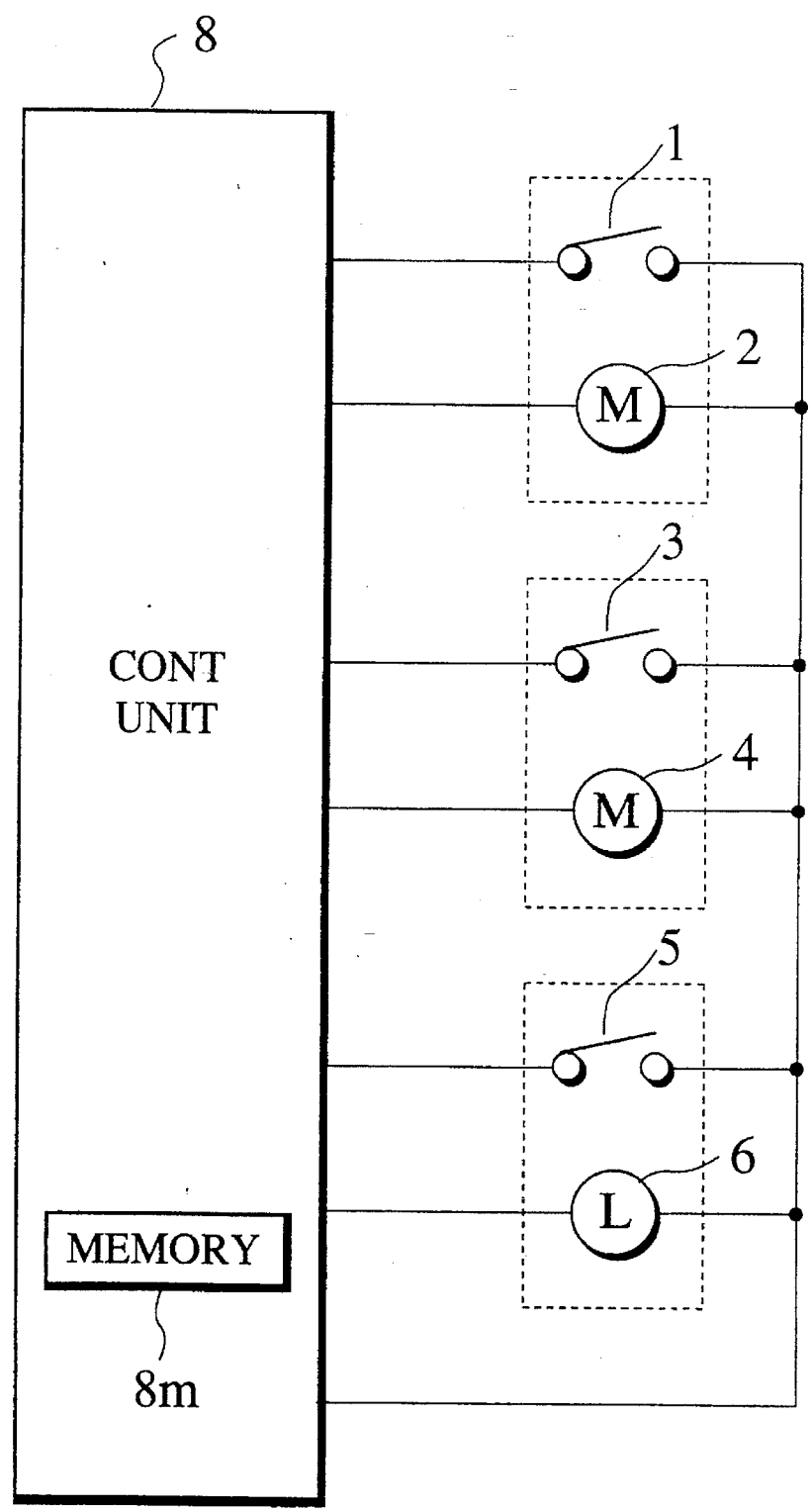
FIG. 2 is a block diagram showing the first embodiment of the electronic control apparatus according to the present invention.

FIG. 2 is a block diagram showing the first embodiment of the electronic control apparatus for an automotive vehicle, in which the present invention is applied to switch circuit. In the drawing, the apparatus comprises a first switch 1 for actuating and deactuating a first actuator 2; a second switch 3 for actuating and deactuating a second actuator 4; a third switch 5 for turning on and off a lamp 6; and an electronic control unit 8. The switches 1, 3 and 5, the actuators 2 and 4, and the lamp 6 are all connected to the electronic control unit 8. The electronic control unit 8 is composed of a microcomputer and peripheral parts such as a memory 8m. Further, the electronic control unit 8 controls the operation of the actuators 2 and 4 and the lamp 6 by executing control programs and in accordance with the on-off operation of the switches 1, 3 and 5. In addition, the control unit 8 diagnoses the failure of the switches 1, 3 and 5 and input circuit of these switches, by executing other control programs described later in further detail.

Figure 3:
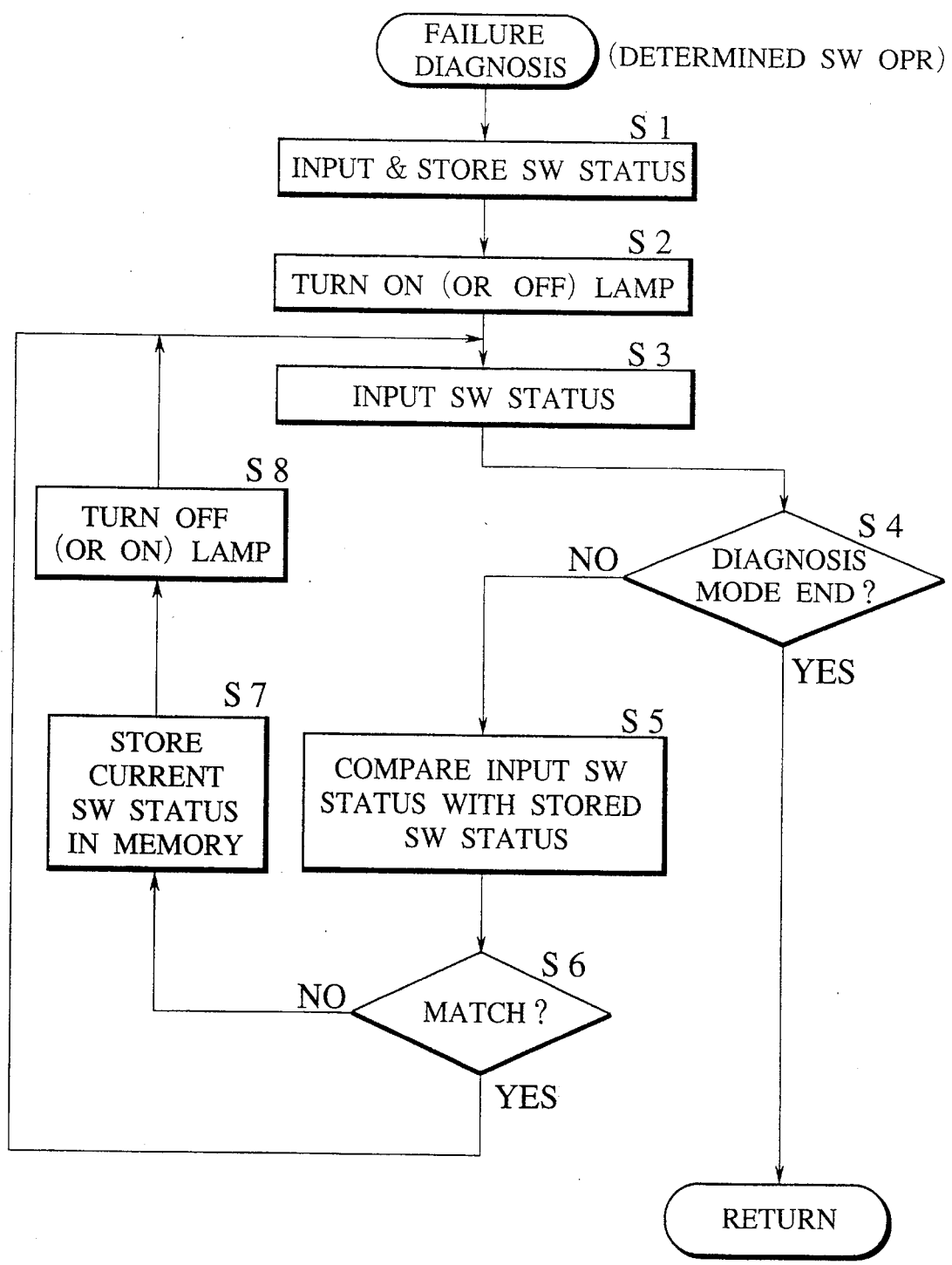
FIG. 3 is a flowchart showing a failure diagnosis program for the first embodiment of the apparatus according to the present invention.

FIG. 3 is a flowchart showing the failure diagnosis program executed by the microcomputer of the electronic control unit 8. The diagnosis operation of the first embodiment will be described with reference to FIG. 3.

Upon a predetermined switch operation, the microcomputer (referred to as control, hereinafter) enters a diagnosis mode and starts to execute a failure diagnosis program. Here, the predetermined switch operation implies such a previously decided switching action that the switch 1 is turned on and off five times within 5 seconds, for instance. In step S1, control inputs the on/off statuses of the switches 1, 3 and 5 and further stores these inputted statuses in the memory 8*m*. Successively, in step S2, control turns on (or off) the lamp 6 to indicate that control is in the diagnosis mode. Here, if the lamp 6 is already turned on, the lamp 6 is turned off to indicate the diagnosis mode in step S2. If the lamp 6 is already turned off, the lamp 6 is turned on to indicate the diagnosis mode in step S2. In step S3, control inputs again the on/off statuses of the switches 1, 3 and 5. In step S4, control discriminates whether a predetermined diagnosis mode end operation has been made. The predetermined diagnosis mode end operation is a predetermined switch operation such that the switch 3 is turned on and off five times within 5 seconds, for instance. If the diagnosis mode end operation has been made, control ends the failure diagnosis and returns to the ordinary control program. If not made, control proceeds to step S5. In step S5, control compares the on/off statues of the switches 1, 3 and 5 inputted in step S1 with other on/off status of the switches 1, 3 and 5 already stored in the memory 8*m*. In other words, the current switch statues are compared with the preceding switch statues. In step S6, control discriminates whether the current switch status match the preceding switch status. If both match, control returns to step S3, and if do not match, control proceeds to step S7.

Here, the fact that the current switch statuses do not match the preceding switch statuses indicates that when any one of the switches is operated, the on/off information of the operated switch is correctly inputted to the electronic control unit 8 (an absence of failure), so that control proceeds to step S7 to update the preceding statuses stored in the memory 8*m* on the basis of the current switch statuses. Thereafter, control proceeds to step S8 to turn off (or on) the lamp 6. In other words, whenever the switch operation is made, as far as the lamp 6 is turned off or on reversely, control discriminates that the input circuit related to at least the operated switch is correct.

On the other hand, the fact that the current switch statuses match the preceding switch status indicates that any of the switches 1, 3 and. 5 is not operated or the on/off information of the operated switch is not correctly inputted to the electronic control unit 8 in spite of the fact that any switch is operated. In the former case, since no switches is operated, the on-off operation of the lamp 6 is not reversed, so that it is not clear whether there exists a failure in the switches 1, 3 and 5 and the related input circuit. In the latter case, on the other hand, since the on-off operation of the lamp 6 is not reversed after any of the switches 1, 3 and 5 has been operated, it is possible to decide that there exists a failure in the operated switch and the related input circuit.

Accordingly, when the switch statues match between the preceding operation and current operation, control returns to step S3, control repeats the above-mentioned processing.

As described above, in the control apparatus of the present invention, after the on-off statuses of the switches have been inputted and further stored in the memory, other on-off statuses of the switches are inputted again for comparison of the currently input switch statuses with the memory stored switch statuses. If both do not match, the on-off operation of the lamp is reversed to indicate that there exists no failure, and further the contents of the memory are updated on the basis of the currently input switch statuses. Accordingly, it is possible to diagnoses the failure of the switch circuit, without providing additional failure diagnosis apparatus or a special apparatus.

In the above-mentioned first embodiment, the switches 1, 3 and 5 correspond to the operation switches; the microcomputer of the electronic control unit 8 and the steps S1 and S3 of the failure diagnosis program (shown in FIG. 3) correspond to the input detecting means; the memory 8*m* corresponds to the storing means; the microcomputer of the electronic control unit 8 and the step S5 of the failure diagnosis program (shown in FIG. 3) correspond to the input comparing means; the microcomputer of the electronic control unit 8, the lamp 6 and the step S8 of the failure diagnosis program (shown in FIG. 3) correspond to the informing means; and the microcomputer of the electronic control unit 8 and the step S7 of the failure diagnosis program (shown in FIG. 3) correspond to the stored content updating means, respectively.

Second Embodiment

Figure 4:
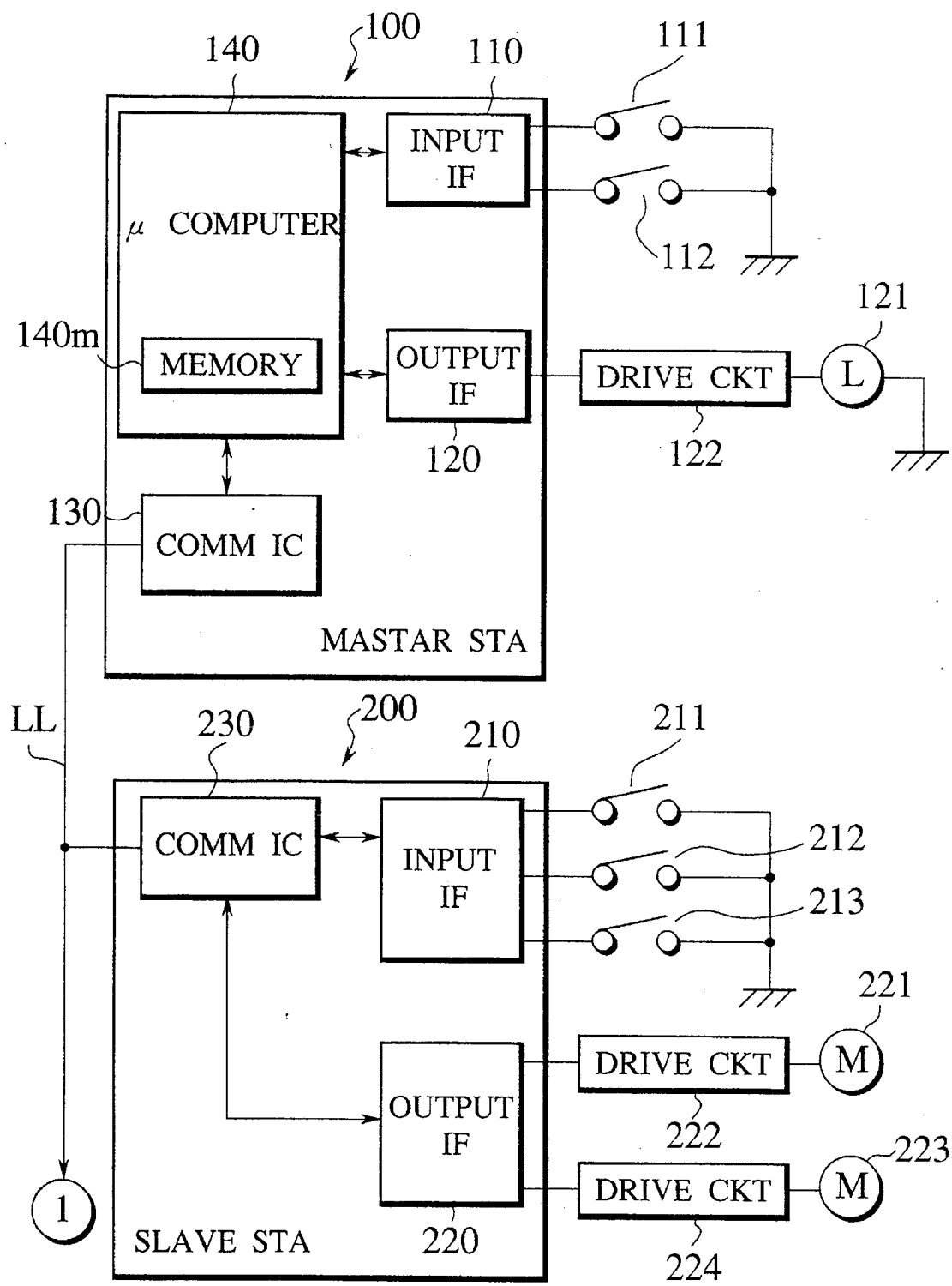
FIG. 4 is a block diagram showing the second embodiment of the electronic control apparatus for an automotive vehicle according to the present invention.
Figure 5:
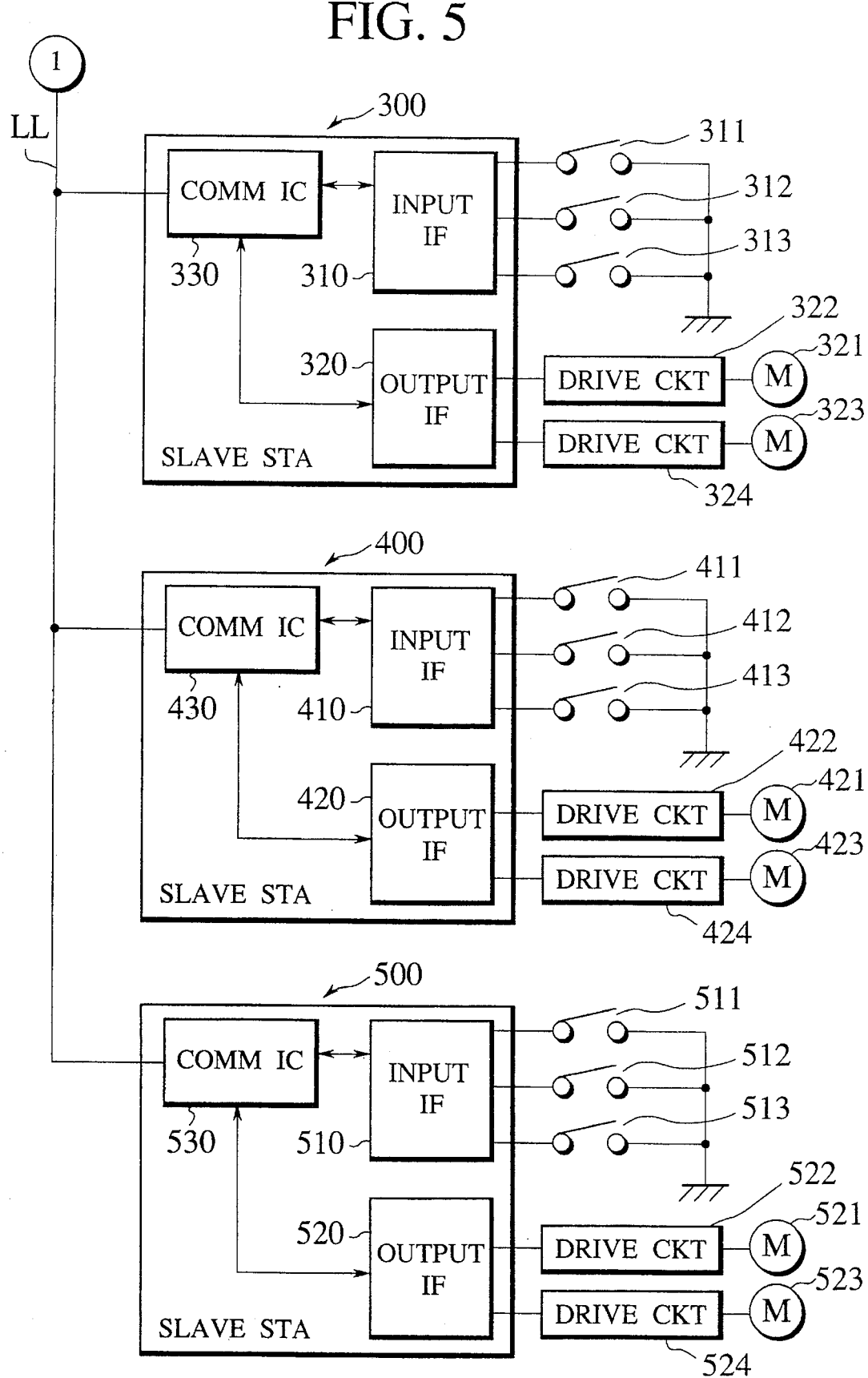
FIG. 5 is block diagram showing the same second embodiment according to the present invention, which follows FIG. 4.

FIGS. 4 and 5 are a block diagram showing the second embodiment of the electronic control apparatus for an automotive vehicle, in which the present invention is applied to a multiplex communication device for an automotive vehicle. In the drawing, the multiple communication system is composed of a master stations 100 and a plurality of slave stations 200, 300, 400 and 500 connected to the master station 100 through a communication line LL, respectively.

The master station 100 disposed in a central console of an automotive vehicle is provided with an input interface (referred to as IF, hereinafter), an output IF 120, a communication IC 130 and a microcomputer 140 including a memory 140*m*. The microcomputer 140 and peripheral parts controls the loads of the respective slave stations 200 to 500 on the basis of the operation information of the switches connected to the respective slave stations 200 to 500. In addition, the microcomputer 140 diagnoses the failure of the communication device and the switches and the related input circuit of the respective slave stations 200 to 500. An ignitions switch 111, a rear defroster switch 112, etc. are connected to the input IF 110. A room lamp 121 is connected to the output IF 120 via a drive circuit 122.

The slave station 200 disposed inside a driver's seat side door includes an input IF 210, an output IF 220 and a communication IC 230. A power window UP switch 211, a power window DOWN switch 212, a door lock knob switch 213, etc. are connected to the input IF 210. A power window actuator 221 and its drive circuit 222 and a door lock actuator 223 and its drive circuit 224, etc. are connected to the output IF 220.

The slave station 300 disposed inside a front passenger's seat side door includes an input IF 310, an output IF 320 and a communication IC 330. A power window UP switch 311, a power window DOWN switch 312, a door lock knob switch 313, etc. are connected to the input IF 310. A power window actuator 321 and its drive circuit 322 and a door lock actuator 323 and its drive circuit 324, etc. are connected to the output IF 320.

The slave station 400 disposed inside a rear right passenger's seat side door includes an input IF 410, an output IF 420 and a communication IC 430. A power window UP switch 411, a power window DOWN switch 412, a door lock knob switch 413, etc. are connected to the input IF 410. A power window actuator 421 and its drive circuit 422 and a door lock actuator 423 and its drive circuit 424, etc. are connected to the output IF 420.

The slave station 500 disposed inside a rear left passenger's seat side door includes an input IF 510, an output IF 520 and a communication IC 530. A power window UP switch 511, a power window DOWN switch 512, a door lock knob switch 513, etc. are connected to the input IF 510. A power window actuator 521 and its drive circuit 522 and a door lock actuator 523 and its drive circuit 524, etc. are connected to the output IF 520.

Figure 6:
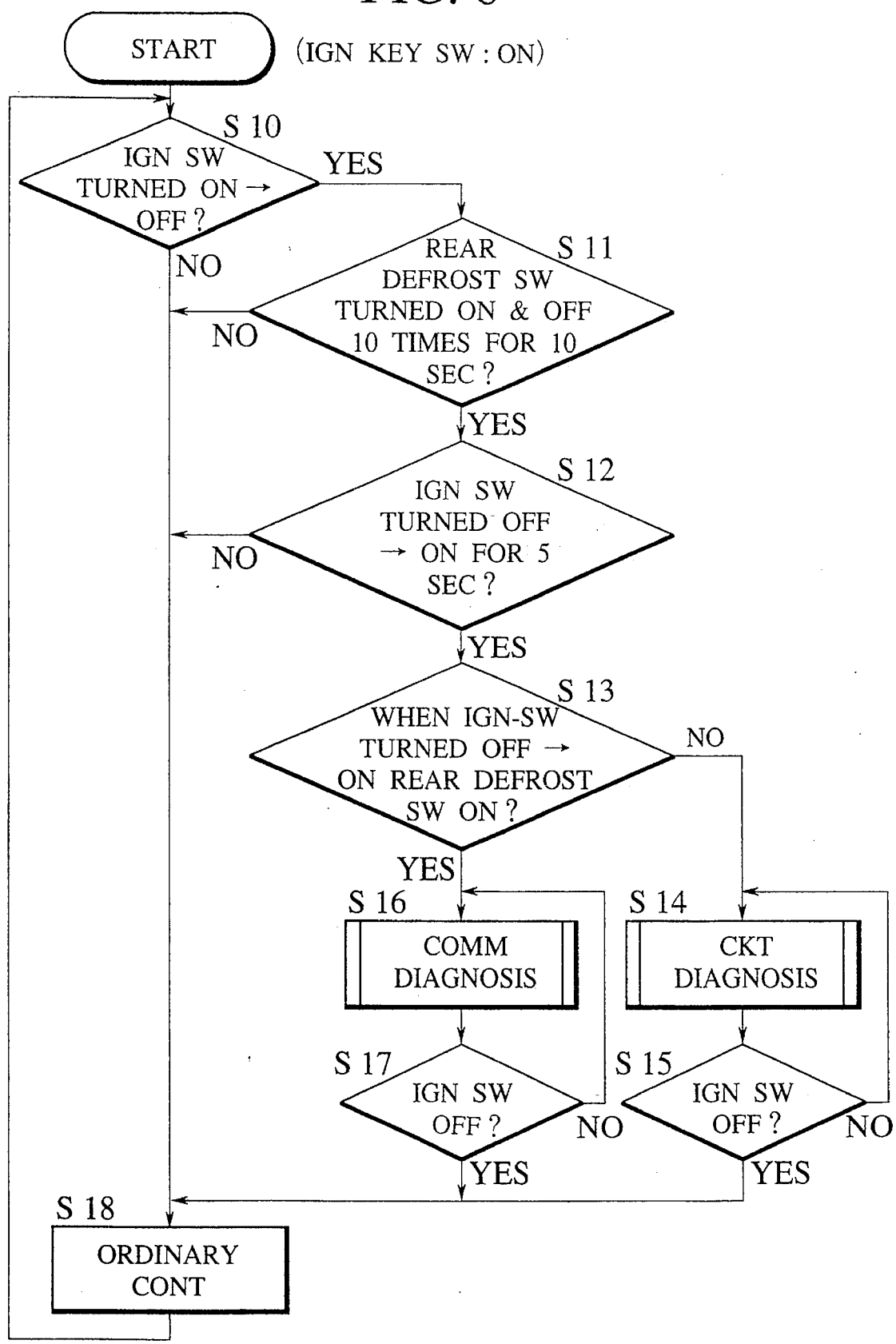
FIG. 6 is a flowchart showing a control program for the second embodiment of the apparatus according to the present invention.

FIG. 6 shows a control program executed by the microcomputer 140. The microcomputer 140 starts to execute the control programs when an ignition key switch 111 is turned on. In step S10, the microcomputer (control) discriminates whether the ignition key switch 111 is turned from on to off. If turned from on to off, control proceeds to step S11. If kept turned on, control proceeds to step S18. In step S11, control discriminate whether the rear defroster switch 112 is repeatedly turned on and off ten times within 10 seconds, for instance. If repeatedly turned on and off, control proceeds to step S12, and if not so, control proceeds to step S18. In step S12, control discriminates whether the ignition switch 111 is turned from off to on within 5 seconds after the rear defroster switch 112 has been repeatedly turned on and off ten times within 10 seconds. If turned from off to on, control proceeds to step S13, and if not so, control proceeds to step S18. In step S18, various actuators are as usual controlled on the basis of the switch information of the slave stations 200 to 500.

After the ignition switch 111 has been once turned from on to off (in step S10) and thereafter the rear defroster switch 112 is turned on and off ten times within 10 seconds (in step S11), when the ignition switch 111 is turned from off to on within 5 seconds (in step S12), control enters a communication diagnosis mode or a switch circuit diagnosis mode. That is, in step S13, control discriminates whether when the ignition switch 111 is turned from off to on, the rear defroster switch 112 is turned on. If turned on, control proceeds to step S16 to execute the communication diagnosis routine, and if turned off, control proceeds to step S14 to execute the circuit diagnosis routine. Further, these diagnosis operation is kept executed until the ignition key switch 111 is turned off in step S15 or S17. When the ignition key switch 111 is turned off, control proceeds to step S18 to execute the ordinary control.

Figure 7:
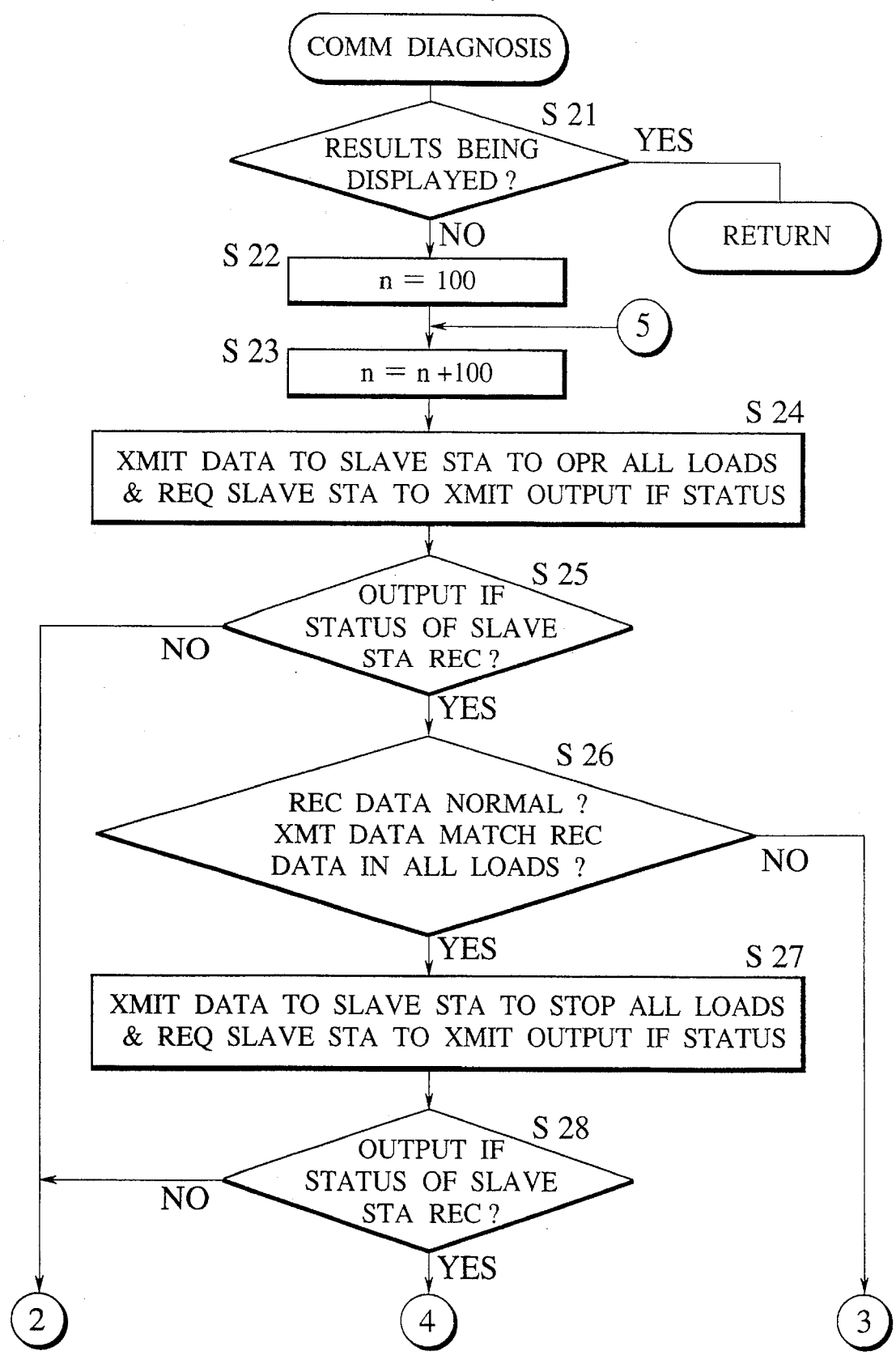
FIG. 7 is a flowchart showing a communication diagnosis program for the second embodiment according to the present invention.
Figure 8:
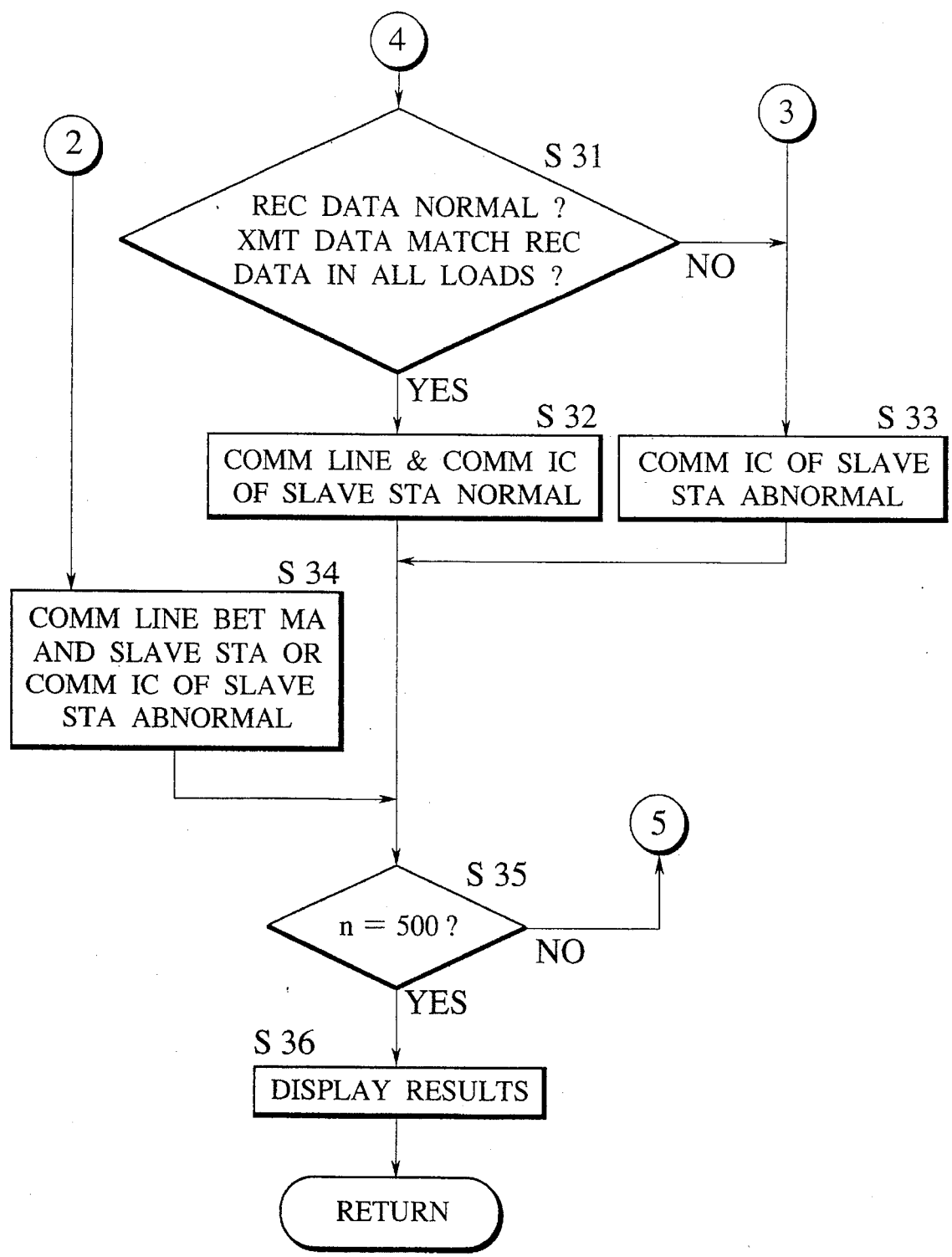
FIG. 8 is a flowchart showing the same communication diagnosis program for the second embodiment according to the present invention, which follows FIG. 7.

With reference to FIGS. 7 and 8, the communication diagnosis operation will be described hereinbelow.

In the case where the presence or absence of failure of the switch circuit connected to the multiple communication device is diagnosed, it is necessary that the communication device is normally operated. Otherwise, the failure of the switch circuit cannot be diagnosed accurately. Accordingly, the communication device is first diagnosed as to the presence or absence of failure, and thereafter the switch circuit are diagnosed.

In step S21, control discriminates whether the diagnosis results of the communication device is now being displayed. The failure of the communication device is diagnosed for each slave station. As the diagnosis results, in case the communication device is determined to be defective, the slave station having the defective communication device is displayed with use of a code by blinking the room lamp 121.

When the diagnosis result is being displayed, control interrupts the diagnosis execution, and returns to the control program shown in FIG. 6. If not so, control proceeds to step S22. In step S22, control sets 100 to n (n=100) and proceeds to step S23 to add 100 to n to indicate the number of the current slave station (n=n+100).

In step S24, control transmits data (for activating all the loads of the actuators connected to the current slave station n) to the slave station n. In more detail, control sets "1" (indicative of "operation") to all the data bits corresponding to all the loads of the slave station n (in the communication frame transmitted from the master station 100 to the respective slave station n), and these data are transmitted. In addition, at the same time, control requests the slave station n to transmit data indicative of the statuses of the output IF (220, 320, 420 or 520) of the slave station n. Successively, in step S25, control discriminates whether the data indicative of the status of the output IF of the slave station n have been received. If received, control proceeds to step S26 and if not so, control proceeds to step S34 shown in FIG. 8. In response to the request of transmitting data indicative of statuses of the output IF (220, 320, 420 or 520) of the slave station n, control sets the statuses of the output IF, that is, "1" (indicative of "operation") or "0" (indicative of "interruption") to all the data bits corresponding to all the loads (in the communication frame transmitted from the slave station n to the master station 100), and these data are transmitted from the slave station n to the master station 100.

Upon reception of the data indicative of the statuses of the output IF transmitted by the slave station n, control proceeds to step S26. In step S26, control discriminates whether the received data are normal data in conformity with the previously determined communication format and in addition whether all the data transmitted from the master station 100 to the slave station n in step S24 match the data now received from the slave station n to the master station 100 with respect to all the loads of the slave station n. As far as the communication devices of the master station 100 and the slave station n are normal, since "1" (operation) is set to all the data bits corresponding to all the loads of the slave station n in step S24 and then transmitted from the slave station n to the master station 100, the statuses of the output IF (220, 320, 420 or 520) of the slave station n must be "1" in all the loads. In addition, all data bits corresponding to all the loads in the communication frame from the slave station n to the master station 100 must be all "1". Therefore, as far as the received data are normal and in addition all the transmitted data match all the received data in all the loads, control proceeds to step S27. If not so, control proceeds to step S33 shown in FIG. 8.

In step S27, control transmits data for interrupting all the loads (e.g., actuators) connected to the slave station n, to the slave station n. In more detail, control sets "0" (interruption) to all the data bits corresponding to all the loads of the slave station n (in the communication frame transmitted from the master station 100 to the respective slave station n), and these data are transmitted. In addition, at the same time, control requests the slave station n to transmit data indicative of the statuses of the output IF (220, 320, 420 or 520) of the slave station n. Successively, in step S28, control discriminates whether the data indicative of the statuses of the output IF have been received. If received, control proceeds to step S31 shown in FIG. 8, and if not so, control proceeds to step S34 shown in FIG. 8. In response to the request of transmitting data indicative of statuses of the output IF (220, 320, 420 or 520), the slave station n sets the status of the output IF, that is, "1" (operation) or "0"

(interruption) to all the data bits corresponding to all the loads (in the communication frame transmitted from the slave station n to the master station), and these data are transmitted to the master station.

Upon reception of the data indicative of the statuses of the output IF transmitted by the slave station n, control proceeds to step S31. In step S31, control discriminates whether the received data are normal data in conformity with the previously determined communication format and in addition whether all the data transmitted from the master station 100 to the slave station n in step S27 match the data now received with respect to all the loads of the slave station n. As far as the communication devices of the master station 100 and the slave station n are normal, since "0" (interruption) is set to all the data bits corresponding to all the loads of the slave station n in step S27 and then transmitted from the slave station n to the master station 100, the statuses of the output IF (220, 320, 420 or 520) of the slave station n must be "0" in all the loads. In addition, all data bits corresponding to all the loads in the communication frame from the slave station n to the master station 100 must be all "0". Therefore, as far as the received data are normal and in addition all the transmitted data match all the received data in all the loads, control proceeds to step S32. If not so, control proceeds to step S33.

As the results of two-time data transmission and reception of all the loads between the master station 100 and the slave station n, as far as the received data are normal and in addition the transmitted data match the received data, it is possible to decide that the communication devices are operating normally. Therefore, in step S32, control determines that the communication line LL and the communication ICs (130 and 230, 330, 430 or 530) are normal between the master station 100 and the slave station n, and proceeds to step S35.

On the other hand, as the results of two-time data transmission and reception of all the loads between the master station 100 and the slave station n, in the case where the received data are not the data without conformity with the previously determined communication frame format or else in the case where, although the data are normal, the transmitted data do not match the received data, in step S33 control determines that the communication ICs (130 and 230, 330, 430 or 530) of the master station 100 and the slave station n are defective, and proceeds to step S35.

Further, in step S25 or S28, in case the status data indicative of the output IF transmitted by the slave station n cannot be received, control proceeds to step S34 to determine that the communication line LL or the communication IC of the slave station n is defective, and proceeds to step S35. In step S35, control discriminates whether the number n is 500 (n=500), that is, the failure diagnosis of the communication device has been executed between the master station 100 and all the slave stations n. If so, control proceeds to step S36, and if not so, control returns to step 23 to execute the communication diagnosis for the succeeding slave station n. After the communication diagnosis of all the slave stations n has been executed, control proceeds to step S36 to blink the room lamp 122 and displays the diagnosis results by a predetermined code.

Figure 9:
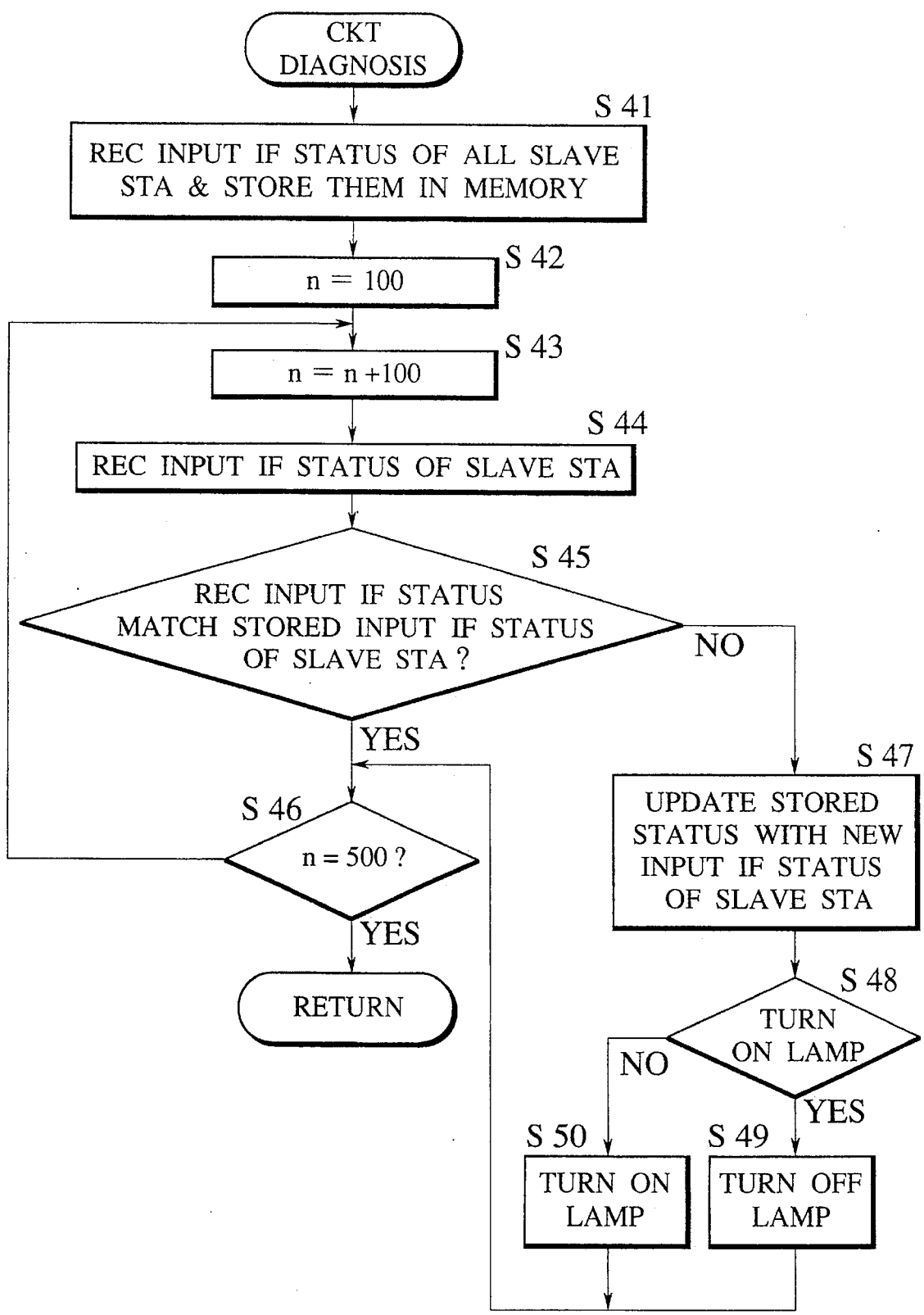
FIG. 9 is a flowchart showing a circuit diagnosis program for the second embodiment according to the present invention.

The switch circuit diagnosis operation will be described hereinbelow with reference to FIG. 9.

In step S41, control first communicates with all the slave stations to receive data indicative of the statuses of the input IF of the respective slave stations 200 to 500, and further stores these received data in the memory 140m. In step S42, control sets 100 to n (n=100), and proceeds to step S43 to add 100 to n to indicate the number of the slave station (n=n+100). In step S44, control communicates with the slave station n to receive data indicative of the statuses of the input IF (210, 310, 410 or 510). In step S45, control compares the currently received data indicative of the statuses of the input IF of the slave station n with the preceding data stored in the memory 140m for discrimination as to whether both match each other.

In the case where the input IF status of the slave station n which have been received and stored in the memory 140m do not match those which are now received, this indicates that when any of the switches connected to the slave station n is operated, the switch operation data are correctly inputted to the microcomputer 140 of the master station 100. Therefore, control proceeds to step S47 to update the contents stored in the memory 140m on the basis of the currently received input IF statuses of the slave station n, and proceeds to step S48. In step S48, control discriminates whether the room lamp 122 is turned on. If turned on, control proceeds to step S49 to turn off the room lamp 122. If not turned on, control proceeds to step S50 to turn on the room lamp 122. In other words, as far as the room lamp 122 is reversely turned from on to off or vice versa due to the switching operation of the slave station n, it is possible to decide that the operated switches of the slave station n and the related input circuit are normal.

Here, the fact that the preceding input IF statuses of the slave station n (stored in the memory) match the currently received input IF statuses of the slave station n indicates that no switches are operated or the switch operation data are not correctly inputted to the microcomputer 140 of the master station 100 in spite of the fact that any of the switches are operated. In the former case, since no switches are operated, the room lamp 122 is not reversed, so that it is not clear whether there exists a failure in the switches and the related circuit of the slave station n. In the latter case, on the other hand, since the room lamp 121 is not reversed after any of the switches of the slave station n has been operated, it is possible to decide that there exists a failure in the switches and the related input circuit.

In step S46, control discriminates whether n=500, that is, the failure diagnosis of the switch circuit has been executed with respect to all the slave stations n. If has been executed, control returns to the control program shown in FIG. 6, and if not yet executed, control returns to the step S43 to execute the failure diagnosis of the switches of the succeeding slave station n.

As described above, in the control apparatus of the present invention, after the on-off statuses of the switches of the slave station have been inputted to the master station through the communication line and further have been stored in the memory, the on-off statuses of the switches of the slave station n are inputted again through the same communication line for comparison of the currently input switch statuses with the memory stored switch statuses. If both do not match, the on-off operation of the lamp is reversed to indicate an absence of failure. Accordingly, it is possible to diagnoses the failure of the switch circuit without providing another failure diagnosis apparatus or a special apparatus.

Further, in any cases of the communication diagnosis or the switch circuit diagnosis, when the load cannot be actuated in spite of the fact that the switch is operated, it is possible to decide that the load is defective. In other words, it is also possible to determine the failure positions by the electronic control apparatus.

In the above-mentioned second embodiment, the switches 111, 112, 211, 212, 311, 321, 313, 411, 412, 413, 511, 512 and 513 correspond to the operation switches; the microcomputer 140 and the steps S41 and S44 of the circuit diagnosis program (shown in FIG. 9) correspond to the input detecting means; the memory 140m corresponds to the storing is means; the microcomputer 140 and the step S45 of the circuit diagnosis program (shown in FIG. 9) correspond to the comparing means; the microcomputer 140, and the room lamp 121 and the steps S48 to S50 of the circuit diagnosis program (shown in FIG. 9) correspond to the informing means, respectively.

Further, the communication IC 130 corresponds to the communication device; the output IF 220 or 320 corresponds to the output circuit; the microcomputer 140 and the steps S24 and S27 of the communication diagnosis program (shown in FIG. 7) corresponds to the transmitting means; the microcomputer 140 and the steps S25 and S28 of the communication diagnosis program (shown in FIG. 7) corresponds to the detecting means; the microcomputer 140 and the steps S26 and S31 of the communication diagnosis program (shown in FIGS. 7 and 8) corresponds to the comparing means; and the microcomputer 140 and the step S36 of the communication diagnosis program (shown in FIG. 8) corresponds to the informing means, respectively.

Further, in the above-mentioned respective embodiment, the diagnosis results are displayed by use of a lamp. Without being limited thereto, however, it is also possible to use a buzzer.

As described above, in the first embodiment of the electronic control apparatus according to the present invention, the statuses of the input circuit of the operation switches are repeatedly detected; the detected statuses are stored in the storing means; the newly detected statuses are compared with the already stored statuses; and when the newly detected statuses do not match the already stored statuses, the switch circuit are diagnosed as to be normal and further the contents of the storing means are updated on the basis of the newly detected statuses. Accordingly, it is possible to simply diagnoses the failure of the switch circuit without providing any additional failure diagnosis apparatus or a special device.

Further, in the second embodiment according to the present invention, the statuses of the output circuit of each slave station are detected according to the command signals of the master station; the detected statuses are compared with the statuses of the transmitted command signals; when both match each other, the communication line and the communication IC are diagnosed as to be normal. Accordingly, it is possible to simply diagnoses the failure of the switch circuit without providing any additional failure diagnosis apparatus or a special device.

What is claimed is:

1. An electronic control apparatus for driving an actuator loaded on an automotive vehicle in accordance with ON-OFF operation of an operation switch, said electronic control apparatus comprising:

an operation switch;

an input circuit connected to said operation switch and said actuator, said input circuit being activated by the operation of said operation switch for driving said actuator;

input detecting means connected to said input circuit for detecting whether said input circuit is in an activated or deactivated status, repeatedly;

storing means connected to said input detecting means for storing the status of said input circuit detected by said input detecting means;

comparing means connected to said input detecting means and said storing means for comparing a present status of said input circuit newly detected by said input detecting means with a previous status of said input circuit stored in said storing means;

informing means connected to said comparing means for providing external information indicative of a mismatch between the present status of said input circuit and the previous status of said input circuit stored in said scoring means on the basis of comparison results by said comparing means; and stored status updating means connected to said comparing means and said storing means for updating the previous status stored in said storing means on the basis of the present status newly detected by said input detecting means after the present status and the previous status have been compared with each other, thereby indicating that at least one of said operation switch and said input circuit is operating abnormally when said informing means does not provide said external mismatch information when said operation switch is operated to the ON-state; and indicating that both said operation switch and said input circuit are operating normally when said informing means provides said external mismatch information and said operation switch is operated to the ON-state.

2. The electronic control apparatus of claim 1, wherein said informing means is a room lamp turned from on to off or vice versa to inform of the comparison results.

3. An electronic control apparatus for driving an actuator loaded on an automotive vehicle in accordance with ON-OFF operation of an operation switch, said electronic control apparatus comprising:

a master station;

a slave station connected to said master station;

a load connected to said slave station, said load having an operated status and an unoperated status;

a communication device disposed in said master station, for transmitting and receiving signals to and from said slave station through a transmission line; and an output circuit disposed in said slave station, for applying signals transmitted by said master station through the transmission line to said load, and wherein said master station includes:

transmitting means for transmitting to said slave station a command signal for commanding said load to a predetermined status;

detecting means for receiving a status of the output circuit of said slave station;

comparing means for comparing the status received by said detecting means with the predetermined status transmitted by said transmitting means; and a room lamp turned from on to off and vice versa in response to a result of a comparison by said comparing means for informing of a mismatch between the status received by said detecting means and the predetermined status transmitted by said transmitting means.

* * * * *